United States Patent Office 3,584,383
Patented June 15, 1971

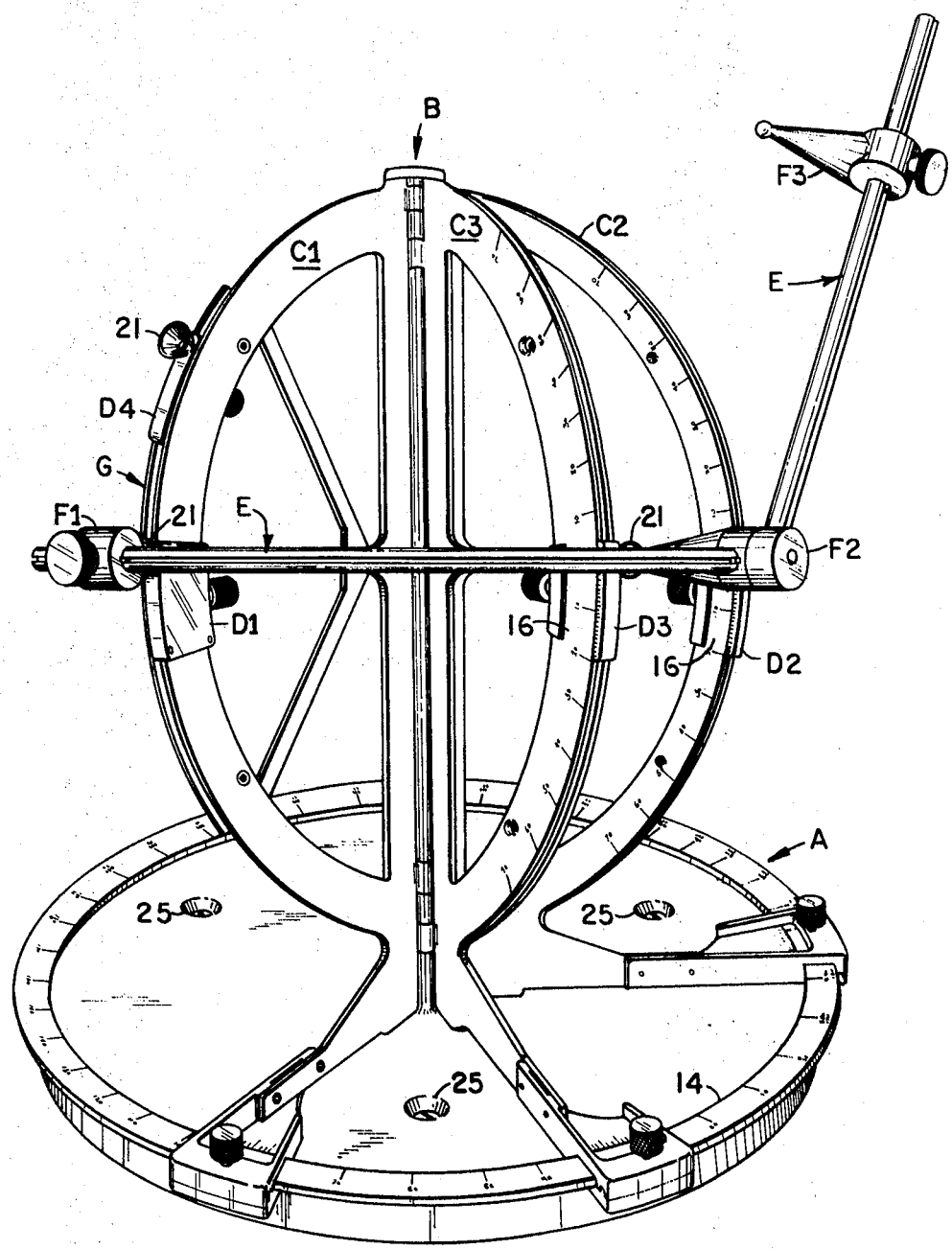
FIG_1

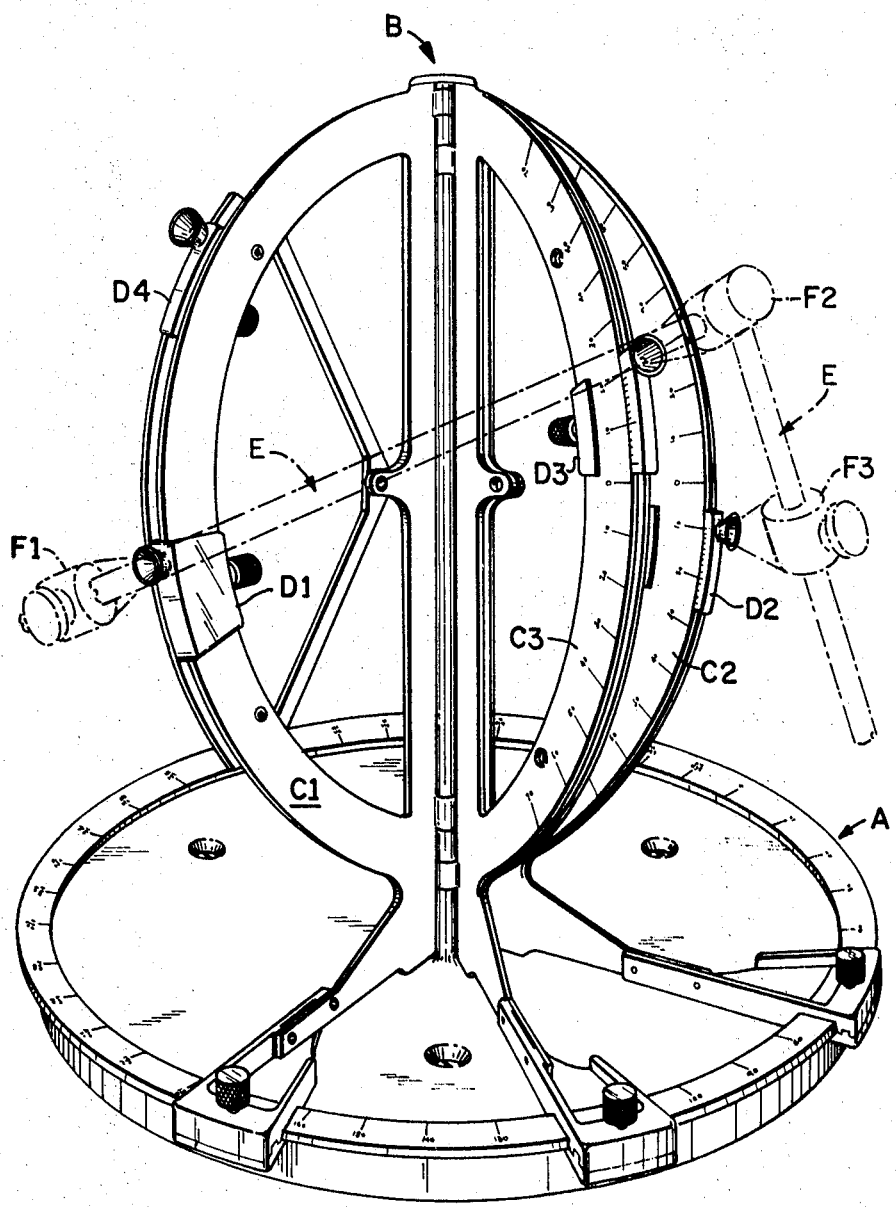
FIG_2

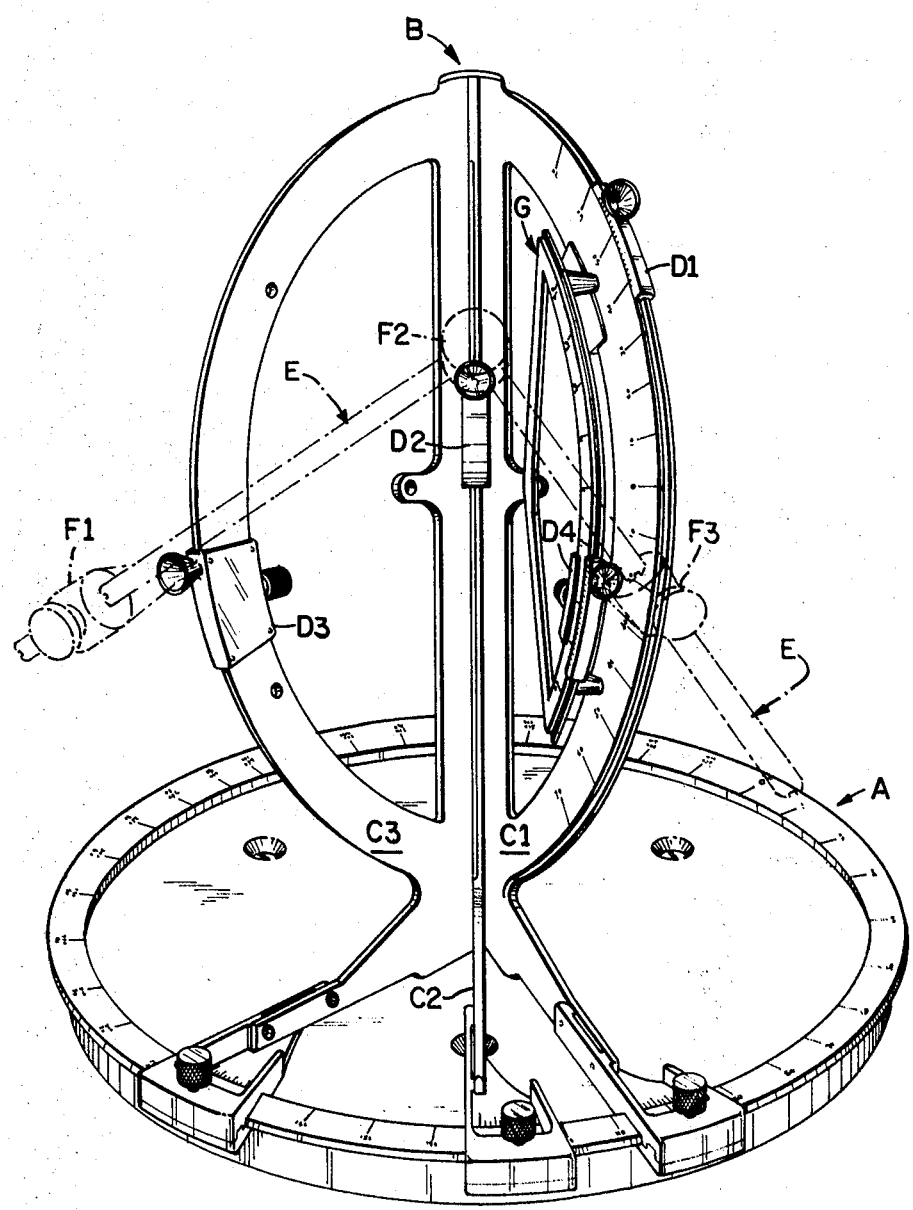
FIG_3

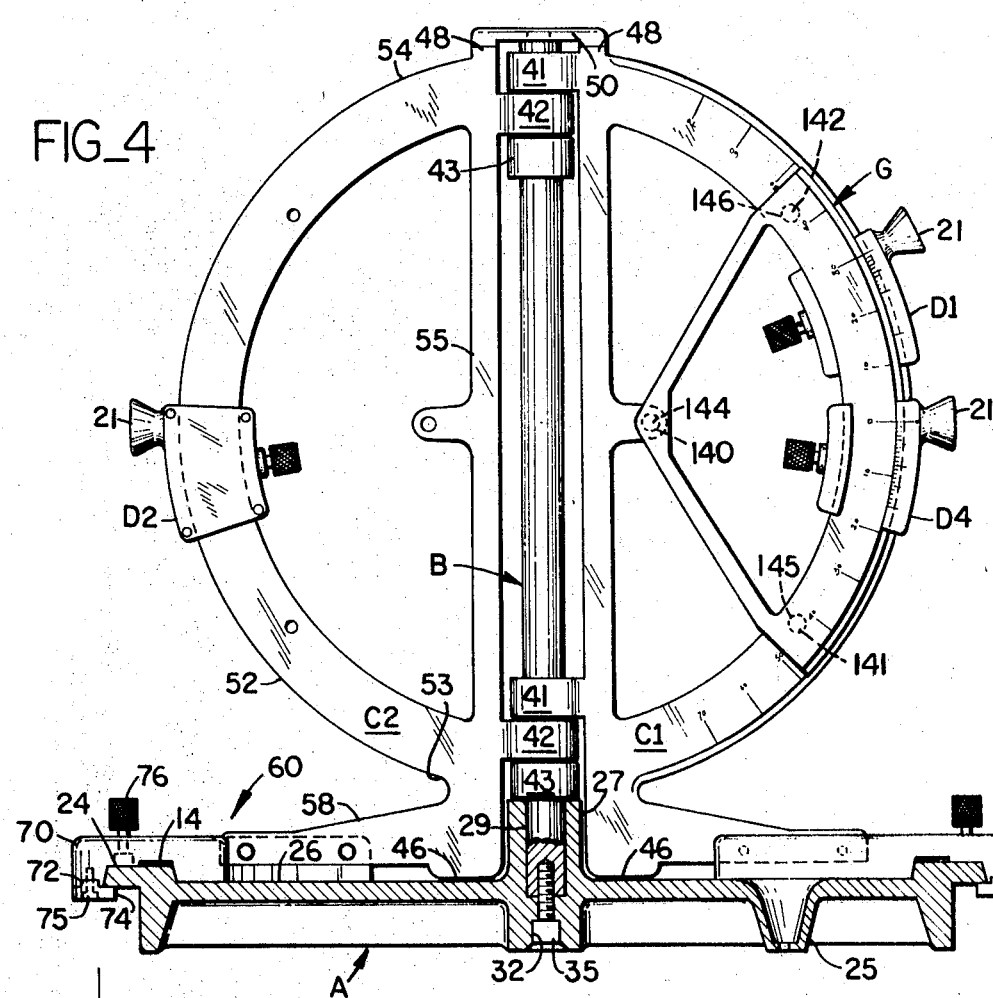

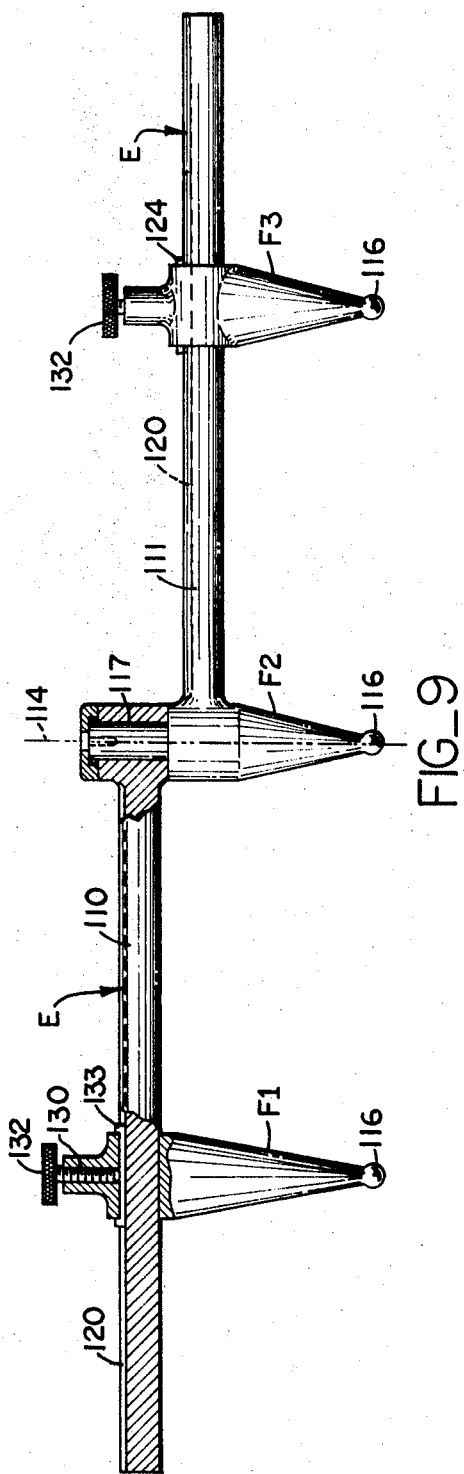
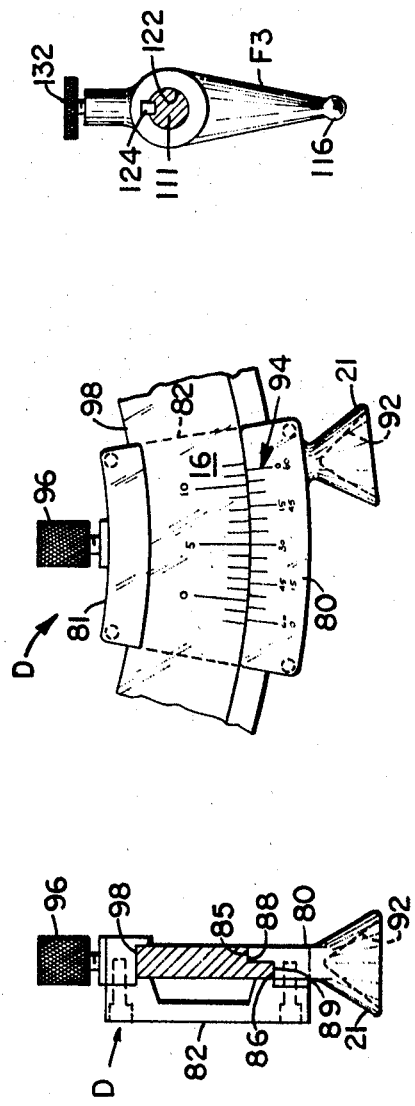

3,584,383
MECHANICAL ANALOGUE FOR NAVIGATIONAL PROBLEM
William A. Davis, Castro Valley, Calif., assignor to Davis Instruments Corporation, San Leandro, Calif.
Filed Dec. 12, 1968, Ser. No. 783,234
Int. Cl. G01c 21/20
U.S. Cl. 33—1                      6 Claims

ABSTRACT OF THE DISCLOSURE

A mechanical analogue solution is provided for the spherical navigational problem. At least three meridian contoured blades are hingeably joined along a common polar axis. Each blade has mounted over its meridian contour a latitude indicator. Two of these indicators are moved to the latitude and longitude of the sub-stellar spot of observed astrobodies. A severable attachment provides for measurement of the co-altitude of two astrobodies from the latitude indicators at their respective sub-stellar spots. This severable attachment locates the remaining latitude indicator at the latitude and longitude of a solution to the navigational equation.

---

This invention relates to an improvement in navigational position computers and more particularly sets forth a mechanical analogue for the spherical trigonometric problem used in celestial navigation.

Celestial navigation is based upon observations obtained with the sextant, time obtained from a chronometer and data obtained from tables, typically the American Nautical Almanac compiled by the United States Naval Observatory. Using the chronometer and the Nautical Almanac, the sub-steller spot or ground position of astrobodies can be plotted for any given moment in time on the earth' surface. Thereafter, by using the angular observations of astrobodies obtained with a sextant, circles of equal altitude can be plotted concentrically about the sub-steller spot on the earth's surface. By determining the points of intersection of these respective circles, the true position of an observer or navigator can be readily determined.

The solution of the nagivational problem is now accomplished with use of voluminous computations and the plotting of the solution of these computations on a Mercater's chart. Commonly, navigational solutions require more than 30 minutes to compute. Furthermore, the possibility of error is ever present in that errors can be made easily in the laborious calculations.

To simplify the navigational problem, mechanical analogues have been constructed. These analogues typically position two indicators at the latitudes and longitudes of the sub-steller spot of two observable astrobodies, these latitudes and longitudes being in turn obtained from the Nautical Almanac in conjunction with the known Greenwich mean time from the chronometer. Once the indicators have been set, the sextant observed co-altitude distance from the respective ground positions of the astrobodies is mechanically measured. These mechanically measured co-altitude distances when rotated about the ground position of the astrobodies scribe circles on the analogue which intersect. The points of intersection comprise solutions to the navigational equation.

Unfortunately, such analogue devices have in the past included elaborate gear linkages and permanently attached arcuate members for physically measuring out the co-altitude distances of the observed astrobodies. These gears and arcuate linkages have made the instruments so complex in apparance that they confuse the analogue visualization of the navigational problem. Moreover, the gear linkages and arcuate members are fragile; computers incorporating such linkages and members are easily broken or damaged when the instruments are used under conditions of constant motion commonly experienced at sea.

It is an object of this invention to construct a mechanical analogue for the spherical navigational problem which is simple and does not confuse or obstruct analogue visualization of the navigational problem. Accordingly, at least three meridian contoured blades are hingeably mounted in coaxial relation about a common axis. Each blade includes a latitude indicator slideably mounted over its meridian contour. By the use of attached scales, two of the latitude indicators can be positioned to the latitude and longitude of the ground position of observed astrobodies. A severable attachment has the co-altitude of the observed astrobodies mechanically measured on hingeably joined co-altitude bars between a central position pin and two ground position pins movable towards and away from the central position pin. The ground position pins are placed on the positioned latitude indicators and the co-altitude bars folded. When folded, the centrally located position pin overlies and contacts the remaining latitude indicator at the latitude and longitude of a solution to the navigational equation.

An advantage of this invention is that the meridian blades, latitude indicators and co-altitude bars are without gear linkages and attached arcuate members. The resultant computer is simple, durable, and capable of being used under conditions of constant motion commonly experienced at sea.

A further advantage of this invention is that the severable co-altitude bars and latitude indicators are each configured with self-aligning sockets. These sockets impart to the co-altitude bars the precisely set ground positions of the observed astrobodies and enable the position pin to precisely locate the latitude and longitude of a solution to the navigational equation.

A further object of this invention is to provide a durable and severable attachment for the measurement of co-altitude which attachment is not complicated by its own attached scale.

An advantage of this invention is that the co-altitude distance or radius of the circle of equal alitiude of the observed astrobody can be set directly onto the co-altitude bar using the sextant observed altitude.

An additional object of this invention is to provide a meridian segment attached to at least one of the meridian blades to eliminate the longitudinal blind spots commonly experienced in navigational analogues of this variety. Typically, because of their common hinged axis, the respective meridian blades of navigational computers of this category cannot be removed to closely spaced longitudinal increments. By the expedient of mounting a segment of a meridian blade, this longitudinal blind spot can be reduced and the range of longitudinally spaced astrobodies and plotted positions useable with the computer greatly expanded.

An advantage of this meridian segment is that it can be used for time spaced shots of the same astrobody for the rapid calculation of latitude.

Other objects, features and advantages of the present invention will be more apparent after referring to the following specification and attached drawings in which:

FIG. 1 is a perspective view of the computer illustrating setting of one of the co-altitude bars;

FIG. 2 is a perpsective view of the computer illustrating the placement of the altitude bars to plot a solution of the navigational equation;

FIG. 3 is a perspective view illustrating the use of an attached meridian segment for reducing the longitudinal blind spots in the computer;

FIG. 4 is a side elevational view of the computer illustrating its construction;

FIG. 5 is a plan view of the meridian blade longitudinal scale;

FIG. 6 is a plan view of the meridian segment as attached to the western side of one of the meridian blades;

FIG. 7 is a side elevation of the latitude scale on each meridian blade together with its vernier scale;

FIG. 8 is a plan section of the longitudinal indicator;

FIG. 9 is a side elevation view of the co-altitude bars; and

FIG. 10 is an end elevation view of one of the co-altitude bars with its attached ground position pins.

With reference to FIG. 1, the navigational computer is illustrated. This instrument has a circular base A with a longitudinal scale 14 about its circumference. Centrally of base A there protrudes perpendicularly upward therefrom an axis or hinge pin B to which three meridian blades $C_1$, $C_2$ and $C_3$ are mounted. Each meridian blade has a latitude indicator $D_1$, $D_2$ and $D_3$, respectively. These indicators slide over the meridian contoured blades on scribed latitude scales 16. Indicators $D_1$ through $D_3$ each have a protruding socket 21 for contacting hingeably joined co-altitude bars E at their respective position pins $F_1$, $F_2$ and $F_3$.

In use, the co-altitudes of the observed astrobodies are set on the hingeably joined co-altitude bars. Typically, two of the meridian blades C have their respective latitude indicators set at their equator. Thereafter, one meridian blade is set at 90° of longitude and the remaining blade set at the altitude of the observed astrobody obtained by sextant. The central position pin $F_2$ is placed at one socket 21 and a spaced position pin (shown as pin $F_1$ in FIG. 1) is slideably moved along the co-altitude bar to fit within the other socket 21 of the meridian blade moved longitudinally to the measured altitude of the selected astrobody. This process spaces ground position pin $F_1$ from central position pin $F_2$ according to the observed co-altitude distance of the first astrobody.

In order to solve the navigational equation for latitude and longitude, the altitudes of the two astrobodies must be observed. Assuming that the first altitude had been set between position pins $F_1$ and $F_2$, the second co-altitude must be set between position pins $F_2$ and $F_3$. Accordingly, the meridians with their indicators at their respective equators are positioned at 90° and at the sextant obtained altitude of the second observed astrobody, respectively. Pins $F_2$ and $F_3$ are placed within the sockets of the latitude indicators, and pin $F_3$ set. This measures the second co-altitude distance necessary for the solution of the navigational equation.

When the altitudes have been set on the meridian bars, two of the blades are moved to the longitude of the astrobodies, shown in FIG. 2 as meridian blades $C_1$ and $C_3$. When moved to the proper longitude, the latitude indicators are set to the respective declinations of the astrobodies (as shown in $D_1$ and $D_2$ of FIG. 2). The altitude indicators are thus positioned at the sub-stellar spots or ground positions of the two observed astrobodies.

Once this setting is made, ground position pin $F_1$ is placed on the indicator $D_1$ set to the ground position of the first astrobody. Likewise, ground position pin $F_3$ is set on the indicator $D_2$ at the ground position of the second astrobody. The altitude bars hingeably rotate along their hinged axis overlying position pin $F_2$ at the latitude and longitude of a solution to the navigational equation.

With reference to FIG. 2 it will be observed that position pin $F_2$ has two separate positions possible for the solution of the navigational equation. One solution places latitude indicator $D_3$ in the northern hemisphere of the computer; the other solution places latitude indicator $D_3$ in the southern hemisphere of the computer. Hopefully, the navigator will know the hemisphere in which he is located. However, some solutions to the navigational equation will necessitate that the navigational equation be solved with a third astrobody. Accordingly, by the expedient of selecting a second pair of astrobodies for the analogue solution, the latitude and longitude position of a single coincident solution can be obtained, eliminating possibility of error.

With reference to FIGS. 1 and 4, base A is shown having a peripheral rim 24 protruding outwardly from the base in flanged relation. Rim 24 has scribed on the inner circumference thereof a longitudinal scale 14. Scale 14 is labeled in 1° longitudinal markings from 0 to 360° west and from 0 to 180° east.

Base A is provided with three securing apertures 25 at 120° intervals of equal radius about axis B. These securing apertures permit the base to be rigidly fastened to a navigator's table. Moreover, due to their equal radial and angular spacing, these apertures permit the computer to be unsecured, turned in 120° angular increments, and re-fastened. This exposes that portion of the longitudinal scale towards the navigator which corresponds to the actual longitudinal segment of the earth which is then being navigated.

Interior of scale 14, base A is provided with surface 26. Surface 26 is flat, circular in shape and has protruding from the central portion thereof a shaft support 27.

Shaft support 27 extends concentrically and upwardly from base A and has a concentric interior aperture 29 having an inside dimension equal to the outside dimension of axis shaft B. Extending downwardly interior of base A there is an aperture 32.

With reference to FIG. 4, axis shaft B fits at its lower end interior of shaft support 27 at aperture 29. The shaft, having a threaded shaft aperture 34 at its lower end, is secured by a shaft securing screw 35 in screw aperture 32 so as to fasten polar axis B in coaxial relation with respect to base A.

Meridian blades $C_1$ through $C_3$ are each hingeably joined to axis B. With reference to FIGS. 1 and 4, meridian blade $C_1$ fastens to the axis at paired hinge segments 41, one segment 41 being at topmost portion of axis B, the other segment being the lower portion of axis B located spatially above and overlying the shaft protuberance of base A. Likewise, meridian blade $C_2$ fastens to axis B at paired hinged segments 42, which hinged segments are immediately below segments 41 at opposite ends of axis B. Similarly, blade $C_3$ is fastened to axis B at paired hinge segments 43, each segment 43 being immediately below a hinge segment 42. It will be thus seen that each blade rotates about axis B on two hinge segments, the hinge segments being equally spaced for each of the respective blades and staggered so that the meridian segments all can occupy a global relation with respect to one another on axis B.

The axial relation of the hinged blades is preserved by two opposed bearing surfaces on each meridian segment. Each meridian blade is provided with a lower meridian bearing cam 46 and an upper meridian bearing cam 48. Lower cam 46 rides on bearing surface 26 of base A maintaining the axial relation of the respective meridian blades $C_1$ through $C_3$. Upper meridian bearing cam 48 in turn rides on a cap 50 threadedly secured to the upper end of axis B. As can be seen, cap 50 at the top of the meridian blades and bearing surface 26 at the bottom of the meridian blade clamps each blade $C_1$ through $C_3$ therebetween. This prevents axial movements of the blades on axis B and assures that the respective segments will move hingeably with respect to one another about axis B in a precise polar relation.

Each meridian blade has an arcuate meridian contour 52. This contour extends outwardly from the bottom of the blade at 53 to the top of the blade at 54 through an arc of approximately 180° with respect to axis B. Extending between the upper and lower ends of the meridian contour is a rigid vertical member of the blade 55 to which each of the hinged segments is attached. Vertical member 55 serves to fasten the arcuate contour 52 of the blade in precise spaced apart relation so that its meridian contour is precisely preserved.

Between the lower portion 53 of arcuate contour 52 and lower meridian bearing cam 46, there extends outward of each blade C a bar 58. Bar 58 as shown in the detail of FIG. 5 is the member to which the longitude indicator 60 of each meridian is attached.

Longitude indicator 60 (shown in side elevation in FIG. 4 and in plan in FIG. 5) functions to provide a precise longitude reading of the position of each meridian blade $C_1$ through $C_3$ and permits the meridian blades to be fastened to base A in a preselected longitudinal relation. It will be seen that each bar 58 has extending outwardly from polar shaft B (in the plan view of FIG. 5) a center line or meridian line 61. Scale mechanism 60 fastens in parallel relation to bar 58 at bar 66 so as to a align the zero indicator of a scribed vernier scale 62 with the center line of the meridian 61.

Regarding vernier 62, this vernier has 12 gradations scribed in longitude scale 60. As is common, in degree and minute verniers, the gradations are separated by an angular distance of 1°5′ and consequently provide reading of the longitude of the respective blades to within at least plus or minus 5′ of accuracy.

The surface on which scale 62 is scribed has an elevation (shown in FIG. 4) which is precisely equal to the elevation of longitude scale 14 on line 24 of base A. This surface terminates at an arcuate boundary 64 precisely mating scale 14 on the rim of base A. Two supporting arches 66 and 67 fasten the surface on which scale 62 is scribed to the outer flange gripping portion 70 of the longitude scale 60.

Regarding the gripping function of each scale 60, it will be noted that the outer portion of the scale mechanism has a protruding lip 72 which extends downwardly of the scale 60 a distance equal to the thickness of scale rim 24 on base A. At the lower portion of each protruding lip 72 there is fastened wedge 74. Wedge 74 is keyed to fit interior of a mating key way in lip 72 and is secured by screw 75. By the expedient of turning on a threaded adjustment screw 76 bearing downwardly on rim 24 at its lower end, wedge 74 moves into gripping contact with the lower surface of rim 24 so as to permit precise positioning of each meridian leaf $C_1$ through $C_3$ in longitudinal relation about polar axis B.

Functioning in a manner analogous to longitude indicator 60 attached to each meridian blade $C_1$ through $C_3$, there is a latitude indicator $D_1$ through $D_3$. These latitude indicators slide over the meridian contour of each of the meridian blades and indicate at their attached vernier the precise latitude. An attached adjustment screw permits their securing in selected latitude relation to the meridian segments.

With reference to FIG. 7, latitude indicator D is illustrated. Each latitude indicator D has an outer vernier scale member 80, meridian blade gripping member 81, with a linking member 82 extending therebetween. The latitude indicators D thus have a U-shaped side configuration for sliding along the meridian blades with latitude scale 16 at the open portion of the U.

Outer vernier member 80 (shown in side elevation in the view of FIG. 10) is provided with an outer step 85 and an inner step 86 so as to lock the indicator D in sliding relation on each meridian blade C. Complementary to outer step 85 and inner step 86, each meridian blade has configured therein steps 88 and 89. These steps extend over the entire arcuate contour of each meridian blade and in cooperation with steps 85 and 86 of the indicators lock the indicator D to the meridian blades at all positions of latitude movement.

Extending upwardly and outwardly from the gripped meridian blade C, there is a flared indicator socket 21. Socket 21 is provided with a conical interior aperture 92 which aperture permits the co-altitude bars E to be positioned at their position pins F interior of each indicator D.

Latitude vernier scale 94 underlies the conical socket 92 of each indicator D at the zero gradation on its attached vernier. Similar to the vernier illustrated for use with respect to the longitude gradations, latitude vernier 94 mates with a latitude scale 16 and has 12 separate gradations angularly spaced at 1°5′ intervals with respect to the meridian contour of each of the meridian plates C.

Latitude indicators D can be fastened in precise latitude relation on each of the blades C by means of an attached set screw 96. Screw 96 functions to bear on the inner surface 98 of each meridian blade firmly compressing outer vernier member 80 onto the respective steps 88 and 89 of each blade C.

Having set forth the general configuration of base A, polar axis B, meridian blade C, and latitude indicator D, the relation of co-altitude bars E, and position pins F can now be set forth. Referring to the details of FIGS. 9 and 10, two co-altitude bars 110 and 111 are joined at a common hinged axis 114. Protruding outwardly from the lower co-altitude bar 111 is central position pin $F_2$. As can be seen, pin $F_2$ is conical in shape and terminates at its lower end on hinged axis 114 at a position ball 116. The respective bars 110 and 111 are maintained in their hinged position by a common hinge pin 117 which interconnects the respetcive bars at internal circular apertures.

As shown in the side elevation of FIG. 9, each of the bars 110 and 111 has configured therein a key slot 120. Slot 120 is in turn mated by a sliding key, which key is affixed to each of the position pins $F_1$ and $F_3$ at their carriage, which carriage is movable in sliding relation along the length of the bar.

Similar to position pin $F_2$, position pins $F_1$ and $F_3$ are conical in shape and terminate at a lower position ball 116 at the apex of their respective cones. At the carriage where they attach to the bars, each position pin is provided with a circular bar aperture 122 and a key accommodating groove 124. At their respective carriages position pins $F_1$ and $F_3$ have threaded aperture 130 to which set screw 132 fastens. This screw wedges U-shaped key 133 having a section complementary to key slots 120. As is apparent, when precise positioning of the respective position pins is desired, either of the pins $F_1$ or $F_3$ can be slideably moved towards and away from the central position $F_2$ to the desired co-altitude distance of an observed astrobody, and thence rigidly secured.

It is required that position ball 116 of position pin $F_2$ lie along the hinged axis 114 of the joined co-altitude bars 110 and 111. This permits the remaining position pins to rotate at a constant and unchanging distance from pin $F_2$ when the bars are moved to contact latitude indicators D.

It will be noted that pin $F_1$ is longer than pins $F_2$ and $F_3$ so as to place all balls 116 within a common plane parallel to each of the joined co-altitude bars. This length of the respective position pins $F_1$ through $F_3$ is preferred so that the maximum range of angular contact can be maintained between the conical sockets 21 of the indicators and the ball 116 of the position pins.

In actual practice, a navigator positioned at one point of the earth's surface cannot observe more than 90° of the exposed celestial heaven with respect to a vertical line including the earth's center and extending upwardly into space. Since, as a practical consideration, co-altitudes in excess of 90° of equatorial arc will never be needed, it is only necessary that each of the altitude bars have a chord length equal to 90 longitudinal degrees about the equator of the analogue instrument.

The balls 116 and their mating sockets 92 enable the angular aspect of the position pins $F_1$ through $F_3$ to be changed with respect to the latitude indicators $D_1$ through $D_3$. This varied angular contact between the pins and indicators permits the hingeably conjoined co-altitude bars to contact the latitude indicators in virtually any three selected positions of navigational spacing.

Meridian leaves C as hingeably mounted about the axis B have one serious disadvantage. Because of their common hinged axis, these leaves cannot be moved to closely spaced increments of longitudinal arc, in the instant case an angle of less than 22°. Unfortunately, astrobodies and navigational solutions are commonly observed having longitudinal arcs of less than 22° therebetween. Using the meridian blades $C_1$ through $C_3$ alone, such a restricted longitudinal arc results in the analogue computer of this invention having numerous longitudinal blind spots.

To overcome this limitation, a meridian segment G is attached to one of the blades. This meridian segment, illustrated attached to blade $C_1$ inclines a segment of a meridian and an attached latitude scale at a longitudinal angle of 15° west with respect to its attached meridian blade.

Referring to FIGS. 4 and 6, a meridian segment is shown occupying approximately some 88° of latitude arc. This segment fastens to the center line of meridian blades $C_3$ at apertures 140, 141, and 142.

Apertures 140, 141 and 142 are each tapered, and have a bottom surface which lies precisely on the center line of meridian blade $C_1$. Extending upwardly from the bottom surface of the apertures and diverging outwardly are conically tapered slopes.

Complementary to apertures 140, 141 and 142, meridian G has flat and round segment mating surface 144, 145 and 146 with complementary diverging conical walls extending from the surfaces outward in the direction of the segment. When segment G is fastened to meridian blade $C_1$, the respective mating surfaces position segment G at a precise 15° angular interval with respect to meridian blade $C_1$. As can be seen, the meridian segment G is joined to meridian segment $C_1$ by screws extending through the width of the blade.

Meridian segment G has positioned thereon an indicator $D_4$. Indicator $D_4$, in a manner precisely analogous to that of indicators $D_1$ through $D_3$, rides over the meridian segment at its outward arcuate meridian contoured surface and indicates its precise position of latitude to within plus or minus 5'.

It should be noted that meridian segment G fastens to the western side of meridian blade $C_1$ adjoining its latitude scale 16. This fastening permits latitude indicator $D_1$ on blade $C_1$ to slide past the connections to meridian segment G without contact or obstruction of the latitude scale 16 on the meridian blade $C_1$.

Use of the meridian segment is illustrated specifically in FIG. 3. Indicator $D_4$ is shown positioned on meridian segment G to the declination of an observed astrobody. Longitude of the observed astrobody is determined by reading the vernier scale attached to meridian blade $C_1$ and adding 15° thereto.

Assuming that the co-altitude bars have previously been set, pin $F_3$ is engaged in socket 92 of indicator $D_4$. Likewise, pin $F_1$ is engaged at indicator $D_3$ shown set to the ground position of the second astrobody. With the position pin set, the bars are hingeably moved with respect to one another and central position pin $F_2$ locates indicator $D_2$ and its attached meridian blade $C_2$ to the latitude and longitude of a solution to the navigational equation.

The meridian segment can be removeably attached to the western side of any one of the meridian blades $C_1$ through $C_3$. This permits the elimination of longitudinal blind spots for virtually any combination of navigational positions and observed astrobodies. Moreover, the blades $C_1$ through $C_3$ can be rotated about base A so as to place segment G in the longitudinal relation where it is most useful.

The computer of this invention is particularly useful in obtaining latitude without Greenwich mean time. Such latitude can be obtained either by time spaced sextant observations of a single astrobody of known declination or alternately simultaneous shots of paired astrobodies of known sidereal hour angle and declination.

Regarding the time spaced shots of a single astrobody to determine latitude, two sextant shots are taken of the astrobody, usually at time space increments of one hour or greater. The known declination of the astrobody is set on the latitude indicators of each of two meridian blades and the meridian blades separated by a longitude increment precisely equal to the rotation of the earth for the given time spaced observation of the astrobody. The altitude bars are each positioned to the co-altitude distance observed by the sextant, and thereafter position pins $F_1$ and $F_3$ are placed on the positioned indicators. The central position pin $F_2$ will then position a remaining indicator at the latitude of the observer.

It will be observed that meridian segment G is particularly useful in such navigation computations. As the earth rotates 15 longitudinal degrees for every hour increment of time, if the shots are spaced precisely one hour apart, no longitudinal setting of any of the meridian segments is necessary.

Regarding the observation of latitude with two astrobodies of known longitudinal separation and declination, the process is precisely analogous. Typically, one meridian blade is set at the declination sidereal hour angle of one astrobody and another latitude indicator set at the declination and sidereal hour angle of the second astrobody. Thereafter, essentially simultaneous altitude observations of the astrobodies are made, their co-altitude distance set on the co-altitude bars, and position pins $F_1$ and $F_3$ set at the position indicators corresponding to the observed astrobodies. Thereafter, the central position $F_2$ will locate its indicator at the precise latitude of the observer.

It will be observed that for each of the analogue navigational solutions herein set forth, at least two of the latitude indicators must be set to the declination of observed astrobodies. Accordingly, meridian segment G and its attached latitude indicator $D_4$ enable two of the latitude indicators to be permanently set to the declination of commonly used astrobodies. Thereafter the two remaining latitude indicators can be used first to set the co-altitude on each of the bars and thereafter to determine the latitude and longitude of a solution to the navigational equation.

What is claimed is:

1. A mechanical calculator comprising: at least three meridian shaped blades; means for hingeably mounting said meridian blades for pivotal movement about a common axis; an indicator mounted for slideable movement to a plurality of positions along each said meridian blade; projection receiving means formed on each said indicator having a recess including a circular section; a pair of bars hingeably joined together; a first projection mounted along the pivotal interconnection of said bars; a movable carriage mounted on each bar; a second projection mounted to each carriage; each said projection having a partially circular tip complementary to the circular section of said recess of said projection receiving means to center said projection on said indicator; each said projection receiving means formed to removably receive one of said first and second projections to form a three-dimensional geometric relation.

2. The invention of claim 1 and wherein each said projection is formed in the shape of a ball and each of said projection receiving means is formed in the configuration of a socket having a concavity to said balls.

3. An article of manufacture comprising: a base; a hinge pin extending upwardly from said base; three meridian contoured blades hingeably mounted for coaxial movement about said hinge pin; first scale means mounted on said base about the base of said blades for indicating the longitudinal relation of said blades about said hinge pin; slider means mounted to each of said meridian blades and slideable over the meridian contour of each of said blades; second scale means mounted to said meridian blades for indicating the latitude relation of each of said slider means on its respective meridian blade; each slider having a projection receiver with a circular section; a pair of bars hingeably joined; a first projection mounted along the hinged axis of said bars; a movable carriage mounted on each said bar; second projections mounted to each said carriage; said first and second projections constructed and arranged with a circular section complimentary to the circular section of said projection receiver to removably center said projection relative to said slider means.

4. In a mechanical calculator of geographical position wherein three meridian contoured blades are hingeably mounted in coaxial relation and movable with respect to adjoining meridian blades to hinge binding instruments of longitudinal spacing, scale means are attached adjoining said blades for enabling placement of said blades in preselected longitudinal relation, latitude indicator means are mounted to each of said blades in sliding relation along said meridian contour, second scale means disposed along said meridian contours for precisely positioning each of said latitude indicator means and, means interconnecting said latitude indicator means for determination of solutions to the navigational equation, the improvement with said meridian contoured blades comprising: a segment of a meridian contour; means for attaching said segment of a meridian contour in preselected longitudinal relation to at least one of said meridian contoured blades; latitude indicator means slideable on the meridian contour of said meridian segment; scale means connected between said meridian segment and its respective latitude indicator means.

5. The invention of claim 4 having means mounting said meridian segment to each of said meridian blades.

6. The invention of claim 4 and wherein said meridian segment is mounted to said blade at a longitudinal angle of 15°.

References Cited
UNITED STATES PATENTS

| | | | |
|---|---|---|---|
| 2,374,788 | 5/1945 | Steele | 33—1 |
| 2,519,532 | 8/1950 | Zerbee | 33—1 |
| 2,736,093 | 2/1956 | Zerbee | 33—1 |
| 3,456,350 | 7/1969 | Riblet et al. | 33—1 |

STEPHEN J. TOMSKY, Primary Examiner

U.S. Cl. X.R.

235—61